US011009188B2

(12) United States Patent
Frenal et al.

(10) Patent No.: US 11,009,188 B2
(45) Date of Patent: May 18, 2021

(54) PRESSURIZED FLUID DEVICE AND VALVE AND METHOD OF IDENTIFICATION

(71) Applicant: L'Air Liquide, Société Anonyme pour l'Etude et l'Exploitation des Procédés Georges Claude, Paris (FR)

(72) Inventors: Antoine Frenal, Ezanville (FR); Renaud Ligonesche, Herblay (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 16/318,970

(22) PCT Filed: Jun. 20, 2017

(86) PCT No.: PCT/FR2017/051625
§ 371 (c)(1),
(2) Date: Jan. 18, 2019

(87) PCT Pub. No.: WO2018/015623
PCT Pub. Date: Jan. 25, 2018

(65) Prior Publication Data

US 2019/0219227 A1 Jul. 18, 2019

(30) Foreign Application Priority Data

Jul. 20, 2016 (FR) ...................................... 1656909

(51) Int. Cl.
*F16K 37/00* (2006.01)
*F17C 13/04* (2006.01)

(52) U.S. Cl.
CPC ...... *F17C 13/04* (2013.01); *F17C 2201/0109* (2013.01); *F17C 2201/056* (2013.01);
(Continued)

(58) Field of Classification Search
CPC .............. F17C 13/04; F17C 2205/0326; F17C 2250/0478; F16K 37/0033
See application file for complete search history.

(56) References Cited

U.S. PATENT DOCUMENTS 5,365,617 A * 11/1994 Tarr .......................... E04H 4/12
137/392
5,555,655 A 9/1996 Yager et al.
(Continued)

FOREIGN PATENT DOCUMENTS

DE 199 11 032 9/2000
FR 3 022 972 1/2016

OTHER PUBLICATIONS

Original and Translation of WO 2015197946 A1; Bernard, Philippe; Dec. 30, 2015.*
(Continued)

*Primary Examiner* — Paul J Gray
(74) *Attorney, Agent, or Firm* — Elwood L. Haynes

(57) ABSTRACT

A valve for a pressurized fluid, including a body housing a fluid circuit including an upstream end configured to be placed in communication with a reserve of pressurized fluid and a downstream end configured to be placed in communication with a user apparatus, the circuit including a control valve controlling the flow rate in the circuit, the control valve being operated by a mobile actuating member to command the opening or the closing thereof, the valve including a first wireless remote communications electronic member using electromagnetic data waves, wherein the first electronic communication member is secured to a support component mounted to move on the body of the valve between at least a first position and a second position with respect to the body.

11 Claims, 2 Drawing Sheets

(52) U.S. Cl.
CPC .. *F17C 2201/058* (2013.01); *F17C 2205/013* (2013.01); *F17C 2205/0126* (2013.01); *F17C 2205/0308* (2013.01); *F17C 2205/0326* (2013.01); *F17C 2205/0329* (2013.01); *F17C 2205/0338* (2013.01); *F17C 2205/0385* (2013.01); *F17C 2205/0394* (2013.01); *F17C 2205/058* (2013.01); *F17C 2250/032* (2013.01); *F17C 2250/034* (2013.01); *F17C 2250/036* (2013.01); *F17C 2250/0478* (2013.01); *F17C 2265/04* (2013.01)

(56) References Cited

U.S. PATENT DOCUMENTS

| | | | | |
|---|---|---|---|---|
| 8,517,333 | B2 * | 8/2013 | Briley | F16K 37/0033<br>251/58 |
| 2008/0230509 | A1 | 9/2008 | Koo et al. | |
| 2017/0122497 | A1 * | 5/2017 | Bernard | F16K 27/12 |

OTHER PUBLICATIONS

International Written Opinion for corresponding PCT/FR2017/051625, dated Nov. 14, 2017.
International Search Report for corresponding PCT/FR2017/051625, dated Nov. 14, 2017.

* cited by examiner

PRESSURIZED FLUID DEVICE AND VALVE AND METHOD OF IDENTIFICATION

CROSS REFERENCE TO RELATED APPLICATIONS

This application is a 371 of International PCT Application No. PCT/FR2017/051625, filed Jun. 20, 2017, which claims priority to French Patent No. Application 1656909, filed Jul. 20, 2016, the entire contents of which are incorporated herein by reference.

BACKGROUND

The invention relates to a valve for a pressurized fluid and to a fluid supplying device comprising such a valve.

The invention relates more particularly to a valve for a pressurized fluid, with or without in-built pressure regulator, comprising a body housing a fluid circuit having an upstream end intended to be placed in communication with a reserve of pressurized fluid and a downstream end intended to be placed in communication with a user apparatus, the circuit comprising a control valve controlling the flow rate in the circuit, the control valve being operated by a mobile actuating member to command the opening or the closing thereof, the valve comprising a first wireless remote communications electronic member using electromagnetic data waves.

It is known practice to fit pressurized-fluid cylinders with a communication member intended to exchange information with adjacent apparatuses.

Document DE19911032A describes a gas cylinder fitted with a wireless electronic information communication device housed in the base of a cap that protects the valve.

Document FR3022972A1 describes a device comprising two valves that can be mechanically and fluidically coupled to one another and can communicate via wireless communication members.

The integration of such a communication member needs to meet various requirements (available volume, ability to receive or transmit data wirelessly under satisfactory conditions, etc.). This is particularly relevant when such a communication member is intended to communicate with a communication member of another, adjacent, apparatus using short-range communication.

SUMMARY

One objective of the present invention is to mitigate all or some of the drawbacks of the prior art that are set out above.

To this end, the valve according to the invention, in other respects in accordance with the generic definition thereof given in the above preamble, is essentially characterized in that the first electronic communication member is secured to a support component mounted with the ability to move on the body of the valve between at least a first position and a second position with respect to the body.

Moreover, some embodiments of the invention may include one or more of the following features:

- the support component mounted with the ability to move on the body of the valve forms an exterior casing attached to at least part of the exterior surface of the body of the valve,
- the support component comprises a tubular sleeve arranged around at least part of the body of the valve,
- the valve comprises a mounting end comprising mobile attachment members intended to collaborate with complementary attachment members to form a quick-connection system connecting the valve to a gas source or a circuit, the support component with the ability to move being a member for locking and/or unlocking the mobile attachment members,
- the mobile attachment members comprise balls or claws; in its first position, the support component not blocking the movement of the mobile attachment members, and in its second position, the support component blocking the movement of the mobile members,
- the support component is capable of translational and/or rotational movement on the body of the valve,
- the first electronic communication member comprises a wireless data reception and/or transmission antenna,
- the first electronic communication member is configured to communicate wirelessly using at least one of the following technologies: Near Field Communication (NFC), Radio Frequency IDentification (RFID),
- the valve comprises a second remote data transmission member, an electronic data acquisition and processing logic and an antenna for transmitting data in the form of electromagnetic radio waves, said electronic logic being connected to or incorporated into the first electronic communication member and configured to receive and/or transmit remotely, data from the first electronic communication member,
- the at least one electronic communication member of the first assembly is arranged on or around the first valve or is fixed to the cylinder and/or is secured to a protective cap mounted on the cylinder,
- when the second valve is in a position in which it is connected to the first valve, the second valve is partially housed in the cap,
- the second valve comprising a mobile member (such as a valve driver) to command the opening or the closing of the isolation valve element of the first valve,
- the electronic communication members of the first assembly and of the second valve employ wireless communication technology of the same kind having a determined maximum range,
- said maximum range is greater than or equal to or less than or equal to the distance separating said communication members when the support component of the first valve is in its first position,
- said maximum range is less than or equal to the distance separating said communication members when the support component of the first valve is in its first position,
- said maximum range is greater than or equal to the distance separating said communication members when the support component of the first valve is in its second position,
- at least one of the electronic communication members of the first assembly and of the second valve is configured to have a wireless communication range comprised between one millimeter and forty centimeters and preferably between one centimeter and ten centimeters,
- said at least one electronic communication member of the first assembly comprises at least one of the following: a passive transponder without an electromagnetic wave generating device; an active transponder comprising an electromagnetic wave generating device, the transponder comprising an electronic read-only memory or a read-(re)write memory, with or without battery, said at least one communication member of the second valve comprising at least one of the following: a passive transponder without an electromagnetic wave generating device; an active transponder comprising an electromagnetic wave generating device, the transponder comprising an electronic read-only memory or a read-(re)write memory, with or without battery, said at least one electronic communication member of the first assembly is configured to store at least one item of information from among the following: an identification of the cylinder, an item of information relating to the nature of the fluid contained in the cylinder, an item of information relating to the maximum capacity of the cylinder, an item of information relating to the amount of fluid contained in the cylinder, an item of information for identifying the owner or user of the cylinder, an item of information relating to the site of use of the cylinder, an item of information relating to the expiry date of the fluid contained in the cylinder, an item of information relating to a certification of the fluid contained in the cylinder, and a log of at least one of the preceding items of information, the first assembly and/or the second valve, comprises an electronic data acquisition and processing member, said electronic data acquisition and processing member being connected wirelessly or over a wired connection to the electronic communication member of the first assembly and/or to the communication member of the second valve, the electronic data acquisition and processing member being configured to detect a connected or disconnected status of the second valve with respect to the first valve according to the status of the wireless communication link between the electronic communication member of the first assembly and the electronic communication member of the second valve, the device is configured to detect a connected or disconnected status of the second valve with respect to the first valve according to the position (for example first or second position) of the support component of the second valve, the electronic data acquisition and processing member is configured to detect a connected or disconnected status of the second valve with respect to the first valve according to whether the electronic communication member of the second valve is receiving or, respectively, not receiving, data from the electronic member which data are emitted by the electronic communication member of the first valve using a signal of determined signal strength, depending on the connected or disconnected status of the second valve with respect to the first valve, the electronic data acquisition and processing member is configured to initiate or allow or prevent an action relating to the flow of gas passing via the valves and/or to display or send a predetermined item of information.

The invention also relates to a device for supplying pressurized fluid, notably pressurized gas, comprising a first functional assembly comprising at least one pressurized fluid cylinder connected to a first valve, the first valve comprising an internal fluid circuit comprising an isolation valve, the device comprising a second valve forming a physical entity distinct from the first valve, the second valve being fitted with an internal fluid circuit, the first valve and the second valve comprising respective attachment members forming a male/female system for the removable quick connection of the second valve to the first valve, the first assembly comprising at least a wireless remote data communications and storage electronic member using electromagnetic waves, the second valve comprising at least a first wireless remote communications electronic member using electromagnetic waves which is configured to communicate with the electronic member of the first assembly, in which device the second valve is a valve according to any one of the aforementioned or following features, which is to say that the first electronic communication member of the second valve is secured to a support component mounted with the ability to move on the body of said valve between at least a first position and a second position with respect to the body.

According to other possible specific features:

the movement of the support component between its first position and its second position with respect to the body has the effect of moving the first electronic communication member of the second valve closer to the electronic communication member of the first assembly, in the first position of the support component, the first electronic communication member of the second valve is at a distance comprised between 15 and 50 mm away from the electronic communication member of the first assembly, whereas in the second position of the support component, the first electronic communication member of the second valve is at a distance comprised between zero and 14 mm away from the electronic communication member of the first assembly, the first assembly and/or the second valve, comprises an electronic data acquisition and processing member, said electronic data acquisition and processing member being connected wirelessly or over a wired connection to the electronic communication member of the first assembly or to the communication member of the second valve, the electronic data acquisition and processing member being configured to detect a connected or disconnected status of the second valve with respect to the first valve according to the status of the wireless communication link between the electronic communication member of the first assembly and the electronic communication member of the second valve according to the position of the support component of the second valve with respect to the electronic communication member of the first assembly.

The invention also relates to a method for identifying a first functional assembly of a device for supplying pressurized fluid according to any one of the above or following features, the method comprising a first step of connecting a second valve to the first valve of the first functional assembly, a step of wirelessly reading at least one item of data contained in of the electronic communication member of the first by the electronic communication member of the second valve, the method comprising a step of moving the support component between its first and second positions.

The invention may also relate to a cylinder or a collection (rack) of cylinders of pressurized fluid comprising such a device.

The invention may also relate to any alternative device or method comprising any combination of the features above or below.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
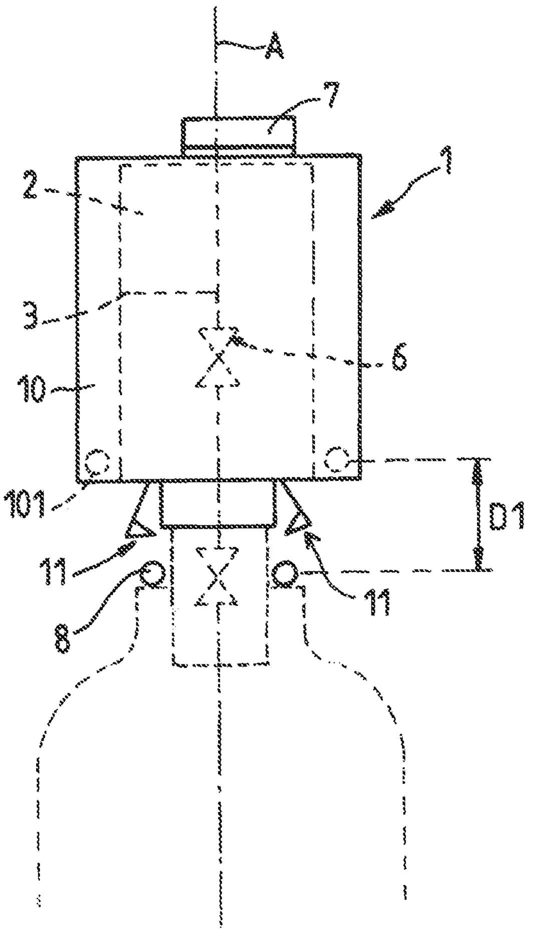
FIG. 1 depicts a schematic and partial side view illustrating one embodiment of a valve according to the invention connected to a source of pressurized fluid and in a first configuration.

The valve 1 for a pressurized fluid depicted schematically in FIGS. 1 to 3 and 5 may be a valve with or without an in-built pressure regulator.

The valve 1 comprises a body 2 housing a fluid circuit 3 having an upstream end 4 intended to be placed in communication with a reserve of pressurized fluid (for example pressurized gas) and a downstream end 5 intended to be placed in communication with a user apparatus (for example at an outlet coupling).

For preference, the body 2 is a single functional entity that cannot be taken apart notably when the valve is in the configuration of use.

The valve 1 may notably be connected to a cylinder or a collection of cylinders of pressurized fluid.

The circuit 3 may in the conventional way comprise a control valve 6 controlling the flow rate in the circuit 3. The control valve 6 may be an isolation valve and/or a flow regulator or pressure regulator.

Figure 2:
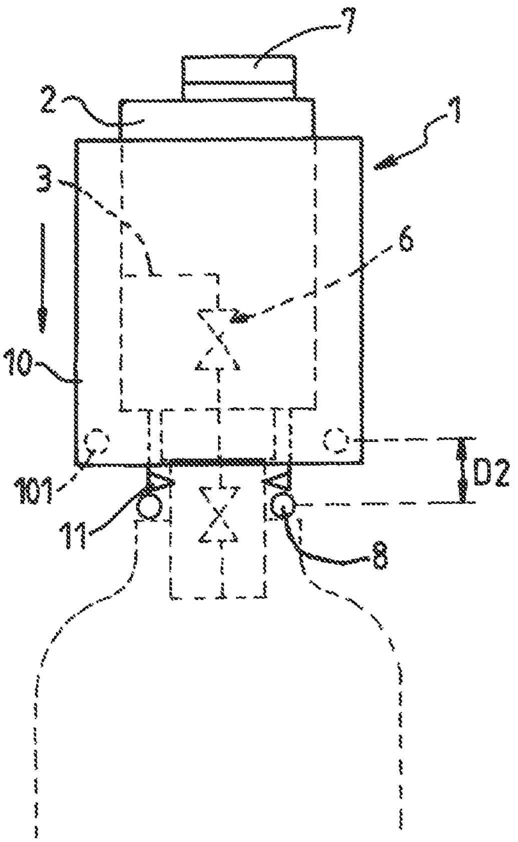
FIG. 2 depicts a view similar to that of FIG. 1, in which the valve is in a second configuration.
Figure 3:
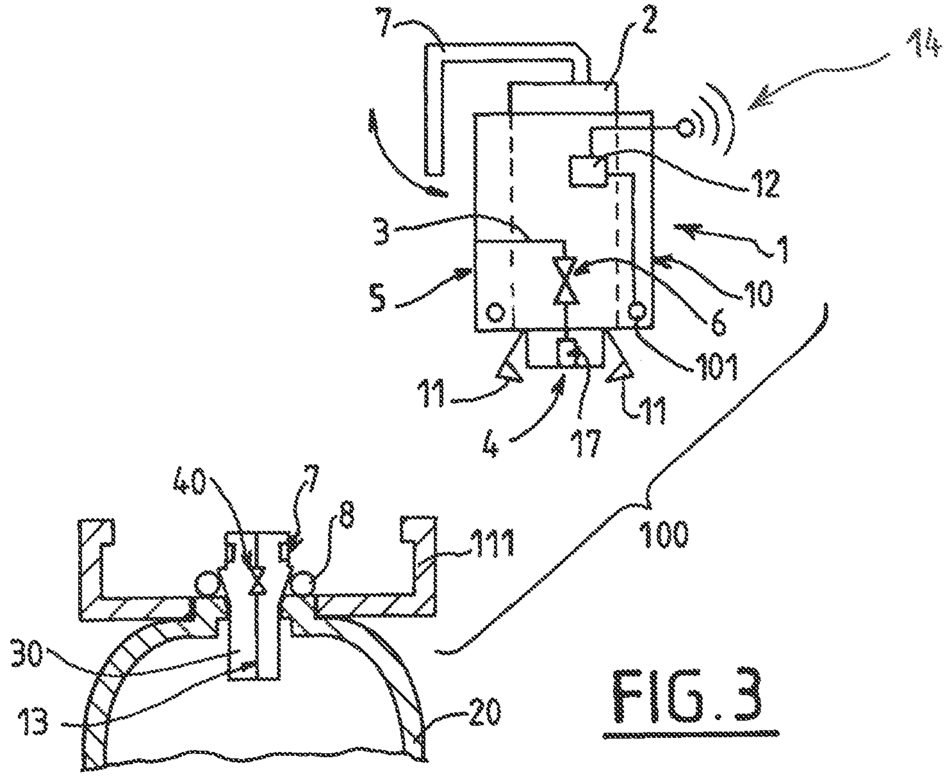
FIG. 3 depicts a schematic and partial side view illustrating another embodiment of a valve according to the invention and of a source of pressurized fluid, the valve being separated from said source of fluid.

The control valve 6 may be operated by a mobile actuating member 7 (manual and/or remote-controlled) to command the opening or the closing of this valve. In the example of FIGS. 1 and 2, this actuating member 7 may be a handwheel or a push-button. In the example of FIG. 3, this actuating member 7 may be a lever pivoting on the body 2.

The valve 1 comprises a first electronic wireless remote communications member 101 using electromagnetic data waves, for example an information medium coupled to an antenna.

According to one advantageous particular feature, this first electronic communication member 101 is secured to a support component 10 mounted with the ability to move on the body 2 of the valve 1 between at least a first position (FIG. 1) and a second position (FIG. 2) with respect to the body 2.

What that means to say is that the support component is able to move between its two positions on the body 2 even when the valve (notably the body thereof) is connected and/or attached to a reserve of pressurized fluid.

For preference, this mobility of the support component 10 is also possible when the valve is not connected/coupled to a reserve of pressurized fluid or to any other member.

What this means to say is that the valve comprises a support component able to move on the body of the valve in order to move the electronic communication member 101. This movement of the support component 10 is achieved without the need to take apart part of the body 2.

What this means to say is that the movement of the support component 10 on the body 2 of the valve makes it possible to change the position of the electronic communication member 101 with respect to one end of the body of the valve (notably without dismantling/taking apart the body).

What that means to say is that it is possible for the support component 10 to be moved on the body 2 whether or not the valve is in the configuration of use.

In this way, this electronic communication member 101 is integrated into a constituent component of the valve 1 and is able to be moved on the valve 1. This movement of the electronic communication member 101 makes it possible for example for the latter to be moved further away from or closer to an exterior communication member with which it is to communicate in the operating position.

This first electronic communication member 101 is, for example, fixed on or integrated into this support component 10.

In the examples depicted in the figures, the support component 10 mounted with the ability to move on the body 2 of the valve 1 forms an exterior casing attached to at least part of the exterior surface of the body 2 of the valve 1.

More specifically, this support component 10 may comprise or consist of a tubular sleeve arranged around at least part of the body 2 of the valve.

For example, this sleeve 10 can be moved manually (or automatically: electrically, pneumatically or hydraulically or magnetically) in a translational movement in a determined direction A which is parallel to the direction in which the valve is mounted on a support.

Of course, as an alternative, the support component 10 could be capable of translational and/or rotational movement on the body 2 of the valve 1 in any other appropriate orientation or configuration.

According to one advantageous possible particular feature, this support component 10 is a member that also has another functionality for the valve 1 other than that of bearing the communication member 101.

In the example depicted in the figures, the valve 1 comprises a mounting end fitted with mobile attachment members 11 intended to collaborate with complementary attachment members to form a quick-connection system for connecting the valve 1 to a gas source or a circuit. According to one advantageous particular feature, the support component 10 is a member for locking and/or unlocking the mobile attachment members 11.

What that means to say is that the mobile attachment members 11 comprise mobile elements (balls and/or claws for example) which catch on mating housings. For example, in its first position, the support component 10 does not block the movement of the mobile attachment members 11 (connection-disconnection is possible, see FIG. 1), whereas in its second position, the support component 10 blocks the movement of the mobile members 11 (disconnection and possibly connection impossible, see FIG. 2).

For example, depending on its position relative to the attachment members 11, the support component 10 acts or does not act as a stop to the movement of these members (for the separation thereof for example).

The first electronic communication member 101 for example comprises a wireless data reception and/or transmission antenna. As depicted schematically in cross section, this antenna is, for example, annular and is arranged around the body 2 of the valve 1 (cf. notably FIG. 5).

This annular shape allows detection/reception in a plurality of positions on an axis passing through its center.

For example, the first electronic communication member 101 is configured to communicate wirelessly using Near Field Communication (NFC) technology. Of course, as an alternative or in combination, the communication technology could be any other suitable technology, notably Radio Frequency IDentification (RFID).

Likewise, as illustrated in FIG. 3, the valve could comprise a second remote data transmission member 12, 14 comprising an electronic data acquisition and processing logic 12 and an antenna 14 for the transmission of data in the form of electromagnetic radio waves.

The electronic logic 12 may be connected to or integrated into the first electronic communication and reading member 101 of the valve 1 and be configured to receive and/or to transmit remotely data from the first electronic communication member 101.

FIG. 3 illustrates a device 100 for supplying pressurized fluid, notably pressurized gas, comprising a first functional assembly 20, 30, 111 comprising at least one cylinder 20 of pressurized fluid which is connected to a first valve 30 and fitted with a cap 111. This first assembly is intended to collaborate where appropriate with a second valve 1 according to the invention.

The second valve 1 forms a physical entity that is separate from the first valve 30. The second valve 1 as described hereinabove can be coupled (mechanically and fluidically) to the first valve 30. The first valve 30 and the second valve 1 thus possess respective attachment members 7, 11 forming a male/female system for the removable quick connection of the second valve 1 to the first valve 30.

The first valve 30 comprises an internal fluid circuit 13 comprising for example at least one isolation valve 40.

In addition to or instead of the control valve 6, the second valve 1 may comprise a member 17 capable of moving (such as a valve driver) for commanding the opening or closing of the isolation valve 40. The member 17 capable of moving is for example controlled by the actuating member 7 (lever 7 or equivalent). When the two valves 1, 30 are coupled, a fluidic connection can be re-established between the internal circuits 13, 3 of the two valves, cf. FIG. 3.

The first assembly 20, 30, 11 comprises at least a wireless remote data communications and storage electronic member 8 using electromagnetic waves which is configured to communicate with the electronic communication member 101 of the second valve 1.

Figure 4:
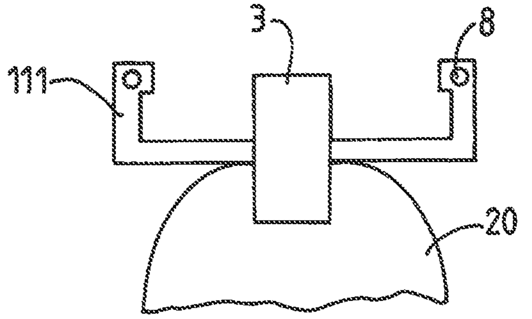
FIG. 4 depicts a schematic and partial side view illustrating an alternative form of embodiment of a source of pressurized fluid that can be connected to said valve according to the invention.
Figure 5:
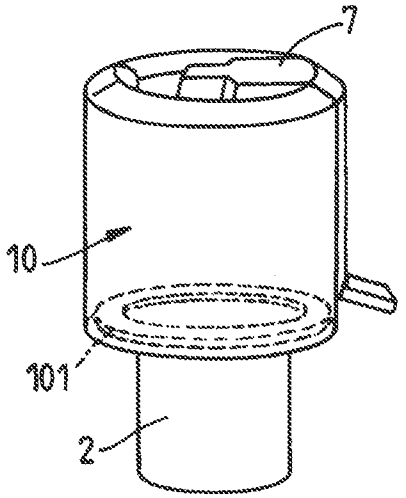
FIG. 5 depicts a schematic and partial perspective view illustrating one embodiment of such a valve.

This communication 1 member 8 may be situated on or around the first valve 30 (cf. FIGS. 1 to 3) and/or on the cylinder 20 and/or on or in the cap 11 (cf. FIG. 4).

When the second valve 1 is coupled to (mounted on) the first valve 30 (cf. FIGS. 1 and 2), the support component 10 (and therefore the communication member 101 that it bears) is able to move with respect to the first 30 and to the second 1 valves (and is therefore also able to move with respect to the electronic communication member 8 of the first valve 30).

Thus, the movement of the support component 10 between its first position (cf. FIG. 1) and its second position with respect to the body 2 (cf. FIG. 2) has the effect of moving the first electronic communication member 101 of the second valve 1 closer to the electronic communication member 8 of the first assembly 20, 30, 11 (and vice versa).

This possibility notably makes it possible to optimize the relative position of these communication members 101, 8 so as to modify the characteristics of their wireless communication.

For example, the device may be configured so that their optimal communication is possible only when the support component 10 is in the second position (cf. FIG. 2).

Likewise, the device may be configured so that their communication is not possible or partial when the support component 10 is in its second position (cf. FIG. 2).

Thus, the device allows for complete operation (detection and/or operation of the electronic apparatuses) only in the event of satisfactory connection.

For example, when the support component 10 is in the first position, the first electronic communication member 101 of the second valve 1 is at a distance D1 comprised between 15 and 50 mm away from the electronic communication member 8 of the first assembly 20, 30, 11. By contrast, when the support component 10 is in the second position, the first electronic communication member 101 of the second valve 1 is at a distance D2 comprised for example between zero and 14 mm away from the electronic communication member 8 of the first assembly 20, 30, 11.

This variation in distance may, if appropriate, be detected by the device (the signal strength being different depending on the separation D1 or D2), so as to:

detect the locking of the connection of the two valves, make a mode of operation conditional on the status of this locking of the mechanical connection of the two valves.

For example, the device 100 may (via an alarm) alert the user to the fact that the mechanical locking of the second valve 1 to the first valve is incorrect, on the basis of the exchange of data between the communication members 8, 101 (for example the nature or strength of the signal).

For example, the data acquisition and processing electronics 12 may be configured to detect a connected or disconnected status of the second valve 1 with respect to the first valve 30 according to the status of the wireless communication link between the electronic communication member 8 of the first assembly and the electronic communication member 101 of the second valve 1 (which means to say according to the position of the support component 10 of the second valve 1 with respect to the electronic communication member 8 of the first assembly).

Likewise, this communication may be interrupted when the support component 10 is moved toward its first position (for example no communication because beyond the maximum communication range of one of the two members 8, 101, or received signal strength insufficient).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A valve for a pressurized fluid, comprising a body housing a fluid circuit comprising an upstream end configured to be placed in communication with a reserve of pressurized fluid and a downstream end configured to be placed in communication with a user apparatus, the circuit comprising a control valve controlling the flow rate in the circuit, the control valve being operated by a mobile actuating member to command the opening or the closing thereof, the valve comprising a first wireless remote communications electronic member using electromagnetic data waves, wherein the first electronic communication member is secured to a support component mounted to move on the body of the valve between at least a first position and a second position with respect to the body, further comprising a mounting end comprising mobile attachment members configured to collaborate with complementary attachment members to form a quick-connection system connecting the valve to a gas source or a circuit, and wherein the support component is a member for locking and/or unlocking the mobile attachment members, wherein the mobile attachment members comprise balls or claws and wherein in a first position, the support component does not block the movement of the mobile attachment members, and in a second position, the support component blocks the movement of the mobile members.

2. The valve as claimed in claim 1, wherein the support component forms an exterior casing attached to at least part of an exterior surface of the body of the valve.

3. The valve as claimed in claim 1, wherein the support component comprises a tubular sleeve arranged around at least part of the body of the valve.

4. The valve as claimed in claim 1, wherein the support component is configured to allow translational and/or rotational movement on the body of the valve.

5. The valve as claimed in claim 1, wherein the first electronic communication member comprises a wireless data reception and/or transmission antenna.

6. The valve as claimed in claim 1, wherein the first electronic communication member is configured to communicate wirelessly using at least one of the following technologies: Near Field Communication (NFC), Radio Frequency IDentification (RFID).

7. The valve as claimed in claim 1, further comprising a second remote data transmission member, comprising an electronic data acquisition and processing logic and an antenna for transmitting data in the form of electromagnetic radio waves, said electronic logic being connected to or incorporated into the first electronic communication member and configured to receive and/or transmit remotely, data from the first electronic communication member.

8. A device for supplying pressurized fluid, comprising a first functional assembly comprising at least one pressurized fluid cylinder connected to a first valve, the first valve comprising an internal fluid circuit comprising an isolation valve, the device comprising a second valve forming a physical entity distinct from the first valve, the second valve being fitted with an internal fluid circuit, the first valve and the second valve comprising respective attachment members forming a male/female system for the removable quick connection of the second valve to the first valve, the first assembly comprising at least a second wireless remote data communications electronic member using electromagnetic waves, wherein the second valve is a valve as claimed in claim 1, wherein the movement of the support component between the first position and the second position with respect to the body has the effect of moving the first electronic communication member of the second valve closer to the electronic communication member of the first assembly.

9. The device as claimed in claim 8, wherein, in the first position of the support component, the first electronic communication member of the second valve is at a distance comprised between 15 and 50 mm away from the electronic communication member of the first assembly, whereas in the second position of the support component, the first electronic communication member of the second valve is at a distance comprised between zero and 14 mm away from the electronic communication member of the first assembly.

10. The device as claimed in claim 8, wherein the first assembly and/or the second valve, comprises an electronic data acquisition and processing member, said electronic data acquisition and processing member being connected wirelessly or over a wired connection to the electronic communication member of the first assembly or to the communication member of the second valve the electronic data acquisition and processing member being configured to detect a connected or disconnected status of the second valve with respect to the first valve according to the status of the wireless communication link between the electronic communication member of the first assembly and the electronic communication member of the second valve according to the position of the support component of the second valve with respect to the electronic communication member of the first assembly.

11. A method for identifying a first functional assembly of a device for supplying pressurized fluid as claimed in claim 8, the method comprising a first step of connecting a second valve to the first valve of the first functional assembly, a step of wirelessly reading at least one item of data contained in of the electronic communication member of the first by the electronic communication member of the second valve, and wherein the method comprises a step of moving the support component between the first and second positions.

* * * * *